Patented Sept. 6, 1949

2,481,386

UNITED STATES PATENT OFFICE 2,481,386

WELD AND WELD ROD

Fredrick Kenneth Bloom, Baltimore, Md., assignor, by mesne assignments, to Armco Steel Corporation, a corporation of Ohio No Drawing. Application June 22, 1945, Serial No. 601,059. In Canada March 23, 1945

7 Claims. (Cl. 75—128)

This application is a continuation in part of my co-pending application Serial No. 528,968, filed March 31, 1944, and entitled Weld and weld rod, and the invention relates to welding, more especially to weld rods, an art of deposit-welding and the resulting welds and welded products.

Among the objects of my invention are the provision of weld rods or electrodes having balanced quantities of welding ingredients for use in the production of welds, the provision of a method for forming crack-resistant welds in high or low alloy content steel whereby thoroughly reliable control over the physical and metallurgical properties of the weld is effected, and the provision of the welds themselves for example in parent metal of stainless steel or in armor plate.

Other objects of my invention in part will be obvious and in part pointed out hereinafter.

The invention accordingly consists in the combination and proportionment of elements, composition of materials, and features of construction, the scope of the application of which is indicated in the claims at the end of this specification.

As conducive to a clearer understanding of certain features of my invention, it may be noted at this point that there are many grades of chromium-nickel stainless steel weld rods which give welds which are weak, low in ductility and tend to crack either during formation or in use. I find this in large measure is due to the weld deposit being substantially pure austenitic.

There is a further group of austenitic weld rod compositions in the prior art, namely chromium-manganese and chromium-manganese-nickel varieties, which differ from the substantially pure austenitic grades for such reasons as appreciable quantities of martensite exist in the deposited weld structure. These compositions frequently are objectionable as are the relatively pure austenitic materials. I find the resulting deposit is likely to be hard, brittle, and magnetic indicating that the weld is no longer predominantly austenitic.

It is my observation that there is a marked tendency for welds made from austenitic or austenitic-martensitic compositions to crack, as by hot cracking in the root passes when the filler metal is being deposited. This, of course, lowers the actual strength of the weld and gives a defective joint. A further and quite serious source of trouble, I find, often arises in connection with welds made, as with certain of the filler compositions just mentioned, in or between parent metal portions which are anchored or restrained. The heat of welding and ensuing contraction or cooling are conducive to the setting up of stresses which cannot be relieved sufficiently by the restrained portions to avoid weakening or cracking of the particular weld filler material employed. It is a common occurrence in this connection to have the weld fail, at the interface formed with the parent metal, while cooling or after being put into use. The hardenable steels are especially susceptible to embrittlement and cracking of the welding during fusion weld as when restrained, this usually holding true whether the steels be of low alloy content, such as armor plate, or of a high alloy class including the hardenable stainless steels. A source of the difficulty with cracking is traceable to the type of weld filler composition introduced to the weld.

An outstanding object of my invention accordingly is the provision of a weld method and welding rods or electrodes which give strong, ductile alloy steel welds characterized by a decreased tendency to crack both while being formed and after depositing, and which are useful in producing welds in a wide variety of alloy steels, including those of the hardenable grades, even when the metal being welded is highly restrained.

Referring now more particularly to the practice of my invention, I provide strong, ductile, crack-resistant welds in high alloy or low alloy steels, even under conditions of high restraint of the parent metal, for example, in armor plate or hardenable stainless steels, by thermally fusing to the same a corrosion-resistant chromium-nickel-manganese steel deposit in quantity sufficient to effect welding. In accordance with my invention, the composition is so balanced as to achieve an austenitic-delta ferritic structure. For forming the weld, I employ a source of the deposit metal, that is, a welding rod or electrode, of such composition as to give a resulting weld deposit comprising 20% to 30% chromium, 11% to 21% nickel, from fractional percentages up to 10% manganese, not more than 0.30% carbon, with or without molybdenum ranging from fractional percentages up to 2%, the total alloy content being at least 43%, and the remainder being substantially all iron, the iron thus being not more than about 57%. As a matter of convenience, and because of losses in the welding operations and other variables, I represent the composition of the weld rod or filler materials herein in terms of the resulting weld deposit.

I find that there is a certain critical combination of chromium, nickel, manganese, carbon and iron, (also molybdenum where present) falling by empirical rule within the broad ranges just specified, which assure welds that are strong, ductile and unusually resistant to cracking even under highly restrained conditions of hardenable parent metal. An approximate relationship of the alloy ingredients is defined by the following empirical formula.

$$\text{Maximum \% Ni} = \frac{(\% \text{Cr} + 2(\% \text{Mo}) - 16)^2}{12} - \frac{\% \text{Mn}}{2} + 30(0.10 - \% \text{C}) + 11$$

The substitution in the formula of any quantities falling within the broad percentage ranges of ingredients given hereinbefore is permissible to arrive at the approximate compositions of chromium-nickel-manganese steel welds which I produce. When no molybdenum is to be present in the weld, a zero percentage is substituted in the formula for the molybdenum term.

In the provision of welding rods, electrodes, or other weld filler materials, leaving a relationship between components thereof to ensure a deposit or weld substantially consistent with the terms of the formula above, I follow the rule that the percentages of chromium, nickel, molybdenum, when used, and manganese in the resulting weld are to total at least 43%. A weld in which at least this approximate minimum total maintains, without dilution of the added metal by the parent metal to substantially less than the desired figure, is thoroughly satisfactory.

Seven specific embodiments of my weld in which I provide a chromium-nickel-manganese, welding electrode having a wire or bar core and a coating therefor, in which electrode the total welding metal ingredients are present in such quantities as to yield a deposit of required analysis are given in Table I below:

*Table I*

(a) 26% Cr.; 4.5% Mn; 0.75% Mo; 0.11% C and 19.7% Ni (max.), 49.95% total alloy.
(b) 28% Cr; 2% Mn; 1.5% Mo; 0.2% C and 25.8% Ni (max.), 57.3% total alloy.
(c) 27% Cr; 8% Mn; 0.25% C and 12.6% Ni (max.), 47.6% total alloy.
(d) 22% Cr; 8% Mn; 1% Mo; 0.1% C and 12.8% Ni (max.), 43.3% total alloy.
(e) 25% Cr; 7% Mn; 0.5% Mo; 0.2% C and 12.8% Ni (max.), 45.3% total alloy.
(f) 25% Cr; 4% Mn; 1.5% Mo; 0.08% C and 21.6% Ni (max.), 52.1% total alloy.
(g) 26% Cr; 9% Mn; 1.5% Mo; 0.24% C and 16.3% Ni (max.), 52.8% total alloy.

A preferred composition which I employ yields a deposit having approximately the composition given under (a) above, and more particularly about 16% nickel; that is, about 26% chromium, 4.5% manganese, 0.75% molybdenum, 0.11% carbon, 16% nickel, and the remainder substantially all iron, the total alloy content thus being 47.25%.

The electrode core and coating for the same usually together contain the welding metal ingredients; preferably, for the sake of simplicity and economy of production, the iron and nickel constituents and most if not all of the chromium are in alloy form in the core. I find it cheaper to provide at least part of the manganese as an alloy element in the core, and any remainder in the coating. Where production of the core involves working as by drawing, it generally is advantageous to employ the major portion of any molybdenum required in the coating rather than in the core. I maintain the sum total percentage of chromium, nickel, manganese and molybdenum when used, as to give in the weld something above the minimum value of approximately 43%. This will be noted in way of illustration from the several examples (a) through (g) just given. In use, the electrode which incidentally may include a suitable flux material such as a flux binder in the coating, is fused as by means of suitable arc welding equipment onto parent metal to be welded. The metal deposited provides in alloy form the various welding metal ingredients necessary to a weld which is strong, ductile and crack-resistant. Welds of exceptionally high quality are obtained in high alloy or low alloy hardenable steel through the use of my electrodes even though the parent metal is under restraint during the welding operations.

It is within the scope of my invention to depart somewhat from any specific welding composition which is mathematically consistent with the terms of the empirical formula herein. In way of illustration, the minimum amount of nickel permissible may be for best results as much as approximately 3% less than the maximum percentage determined by the formula. If the nickel content is too low in proportion to other elements in the weld deposit, an excess of delta ferrite appears and the weld shows a decrease in ductility usually without marked loss of strength however. On the contrary, if the amount of nickel by much exceeds the maximum amount defined by the formula, the weld deposit is likely to be low in ductility and strength as well.

I find in forming my welds that bead deposits as in root passes have highly satisfactory resistance to cracking even when the parent metal is under restraint and of a hardenable quality which ordinarily is difficult to weld. The resistance to root cracking holds true for bead thicknesses even considerably less than ¼ inch. Upon completion and in use, my welds are strong and ductile and are resistant to cracking both in the body of the deposit and interfacially with respect to the parent metal.

Thus, it will be seen that in my invention there is provided a deposit weld and art of producing the same as well as a fusible welding rod or electrode in which the various objects noted herein together with many thoroughly practical advantages are successfully achieved. It will be noted that the weld is strong, ductile and crack-resistant.

As many possible embodiments of my invention may be made and as many changes may be made in the embodiments hereinbefore set forth, it will be understood that the matter described herein is to be interpreted as illustrative and not as a limitation.

I claim:

1. In a rigidly restrained metal or metals, a crack-resistant weld comprising 20% to 30% chromium, 11% to 21% nickel, from fractional percentages up to 10% manganese, up to 2% molybdenum, and not more than 0.3% carbon in relationship substantially consistent with:

$$\text{Maximum \% Ni} = \frac{(\% \text{Cr} + 2(\% \text{Mo}) - 16)^2}{12} - \frac{\% \text{Mn}}{2} + 30(0.10 - \% \text{C}) + 11$$

and the remainder principally iron not exceeding approximately 57%, said weld being of austenite-delta ferrite structure.

2. A crack-resistant weld deposit of austenitic-delta ferritic structure comprising 20% to 30% chromium, 11% to 21% nickel, from fractional percentages up to 10% manganese, up to 2% molybdenum, and not more than 0.3% carbon in relationship substantially consistent with:

$$\text{Maximum \% Ni} = \frac{(\%\,\text{Cr} + 2(\%\,\text{Mo}) - 16)^2}{12} - \frac{\%\,\text{Mn}}{2} + 30(0.10 - \%\,\text{C}) + 11$$

and the remainder principally iron not exceeding approximately 57%, and the minimum percent of nickel about 3% less than the permissible maximum.

3. A weld deposit of austenitic-delta ferritic structure comprising in combination, 20% to 30% chromium, 11% to 21% nickel, from fractional percentages up to 10% manganese, and not more than 0.3% carbon, in proportions substantially consistent with:

$$\text{Maximum \% Ni} = \frac{(\%\,\text{Cr} - 16)^2}{12} - \frac{\%\,\text{Mn}}{2} + 30(0.10 - \%\,\text{C}) + 11$$

the chromium, nickel, and manganese totalling at least about 43%, and the remainder substantially all iron.

4. A weld rod or electrode of such composition as to yield a deposit, comprising in combination, 20% to 30% chromium, 11% to 21% nickel, from fractional percentages up to 2% molybdenum, from incidental amounts up to 10 manganese, and not more than 0.3% carbon, in proportions substantially consistent with:

$$\text{Maximum \% Ni} = \frac{(\%\,\text{Cr} + 2(\%\,\text{Mo}) - 16)^2}{12} - \frac{\%\,\text{Mn}}{2} + 30(0.10 - \%\,\text{C}) + 11$$

the chromium, nickel, manganese and molybdenum totalling at least about 43%, and the remainder substantially all iron, said deposit being of austenitic-delta ferritic structure.

5. An electrode for deposit welding of such composition as to yield a deposit comprising, in combination, 20% to 30% chromium, 11% to 21% nickel, from fractional percentages up to 2% molybdenum, from incidental amounts up to 10% manganese, and not more than 0.3% carbon, in proportions substantially consistent with:

$$\text{Maximum \% Ni} = \frac{(\%\,\text{Cr} + 2(\%\,\text{Mo}) - 16)^2}{12} - \frac{\%\,\text{Mn}}{2} + 30(0.10 - \%\,\text{C}) + 11$$

and the remainder principally iron not exceeding approximately 57%, and the minimum percent of nickel about 3% less than the permissible maximum, said deposit being largely austenite with effective amounts of delta ferrite.

6. A crack-resistant weld containing approximately 26% chromium, 16% nickel, 4.5% manganese, 0.75% molybdenum, 0.11% carbon, and the remainder substantially all iron, the weld being of austenite-delta ferrite structure.

7. An electrode for deposit welding of such composition as to yield an austenitic-delta ferritic deposit containing approximately 26% chromium, 16% nickel, 4.5% manganese, 0.75% molybdenum, 0.11% carbon, and the remainder substantially all iron.

FREDRICK KENNETH BLOOM.

REFERENCES CITED

The following references are of record in the file of this patent:

UNITED STATES PATENTS

| Number | Name | Date |
|---|---|---|
| 2,083,524 | Payson | June 8, 1937 |
| 2,156,298 | Leitner | May 2, 1939 |
| 2,159,724 | Franks | May 23, 1939 |
| 2,240,672 | Scherer et al. | May 6, 1941 |
| 2,256,614 | Franks | Sept. 23, 1941 |
| 2,329,986 | Goodford | Sept. 21, 1943 |
| 2,358,799 | Franks | Sept. 26, 1944 |

OTHER REFERENCES

Molybdenum, Cerium, and Related Steels, pages 28 to 30, by Gillet and Mack. Published in 1925 by The Chemical Catalog Co., N. Y.